No. 856,814. PATENTED JUNE 11, 1907.
H. P. SCOFIELD.
GUARD.
APPLICATION FILED NOV. 6, 1906.
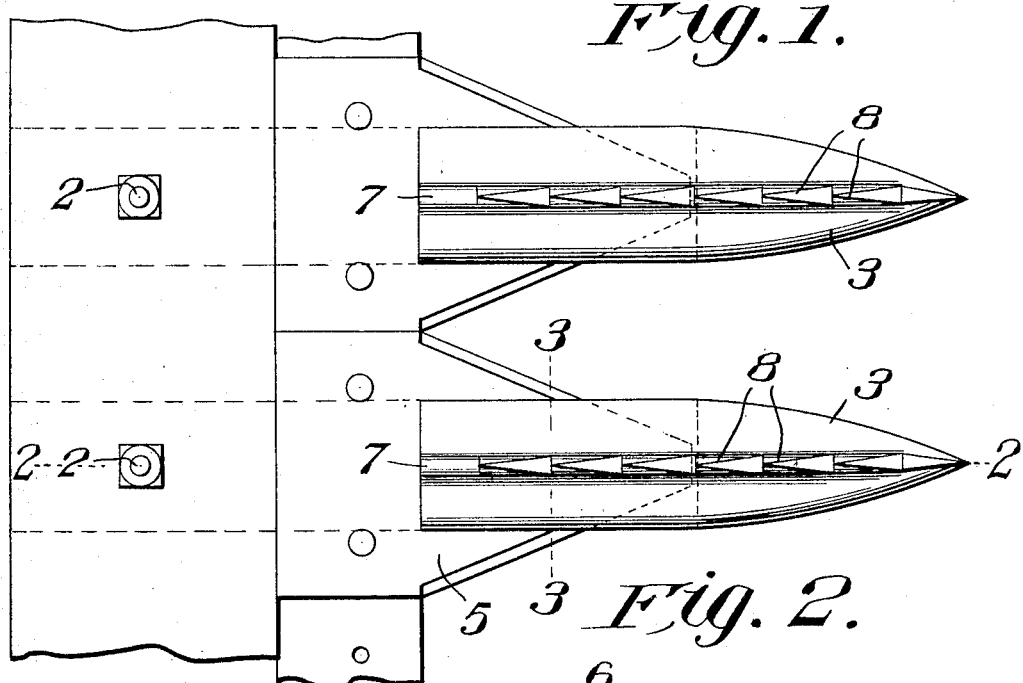
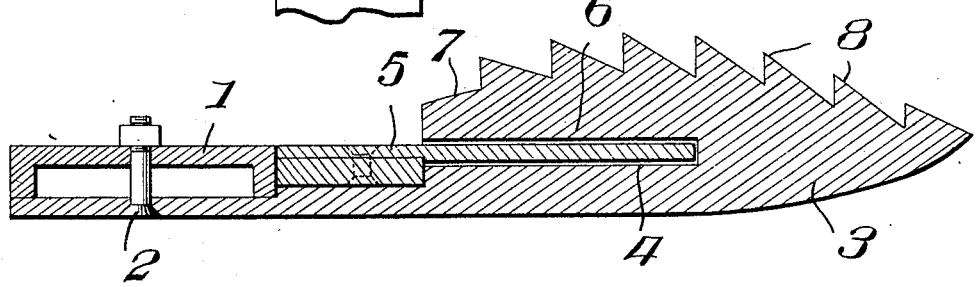
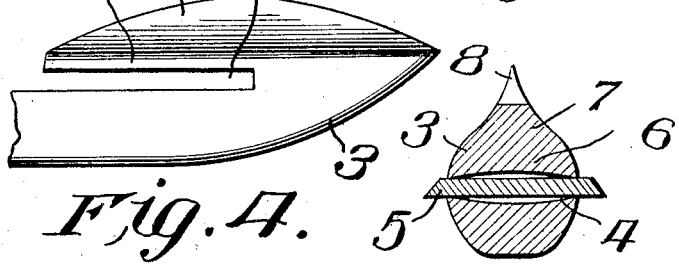
Witnesses
Inventor
H. P. Scofield
By W. J. FitzGerald & Co.,
Attorneys

UNITED STATES PATENT OFFICE.

HYRUM P. SCOFIELD, OF FISHHAVEN, IDAHO.

GUARD.

No. 856,814.     Specification of Letters Patent.     Patented June 11, 1907.

Application filed November 6, 1906. Serial No. 342,230.

*To all whom it may concern:*

Be it known that I, HYRUM P. SCOFIELD, a citizen of the United States, residing at Fishhaven, in the county of Bear Lake and State of Idaho, have invented certain new and useful Improvements in Guards; and I do hereby declare the following to be a full, clear, and exact description of the invention, such as will enable others skilled in the art to which it appertains to make and use the same.

My invention relates to new and useful improvements in guards, and more particularly to that class adapted to be used in connection with sickle bars for protecting the sections of the sickle, and my object is to provide a device of this class whereby the guard will be strengthened at its weakest point, and a further object is to provide means whereby the grass being cut will be prevented from dropping in front of the sickle and thereby pass below the sickle bar.

Other objects and advantages will be hereinafter referred to and more particularly pointed out in the claims.

In the accompanying drawings which are made a part of this application, Figure 1 is a top plan view of a portion of a sickle bar showing my improved guard secured thereto. Fig. 2 is a sectional view as seen on line 2—2 Fig. 1, Fig. 3 is a sectional view as seen on line 3—3, Fig. 1, and, Fig. 4 is an elevation of a guard with the projections omitted.

Referring to the drawings in which similar reference numerals designate corresponding parts throughout the several views, 1 indicates a sickle bar which may be of the usual or any preferred form, to which is secured by means of a bolt 2, my improved form of guard 3, said guard being provided with the usual form of slot 4, through which is adapted to oscillate the usual form of sickle 5.

It has been found in practice that the overhanging portion 6 of the guard soon becomes worn and thereby necessarily weakened so that when heavy or stiff grass is encountered the grass is drawn beneath the overhanging portion and bends the same upwardly so that the sickle will play to such an extent that the grass will not be properly cut thereby causing the machine to choke and to rectify this objectionable feature I have provided a rib 7 which extends from the point of the guard to the rear end of the overhanging portion thereby reinforcing and greatly strengthening the guard at its weakest point.

If desired the upper edge of the rib 7 may be provided with a plurality of projections 8, the outer edges of which are disposed at an angle to the vertical axis of the projections as best shown in Fig. 2 of the drawing while the opposite edges thereof are vertical, the object in so providing the projections being that should the grass when cut fall toward the front end of the guard, the vertical faces of the projections will engage the falling grass and hold the same above the guards until such time as the uncut grass will push the same rearwardly and from the sickle bar thereby preventing the grass from dropping below the sickle bar or into the path of the sickle whereby the same would be cut into smaller particles and it will also be seen that by having the front face of each of the projections tapered that the grass will readily slide rearwardly thereover.

It will now be seen that by providing the rib 7 and extending the same over the body of the guard and over the overhanging portion thereof that the guard will be greatly reinforced and the life of the same prolonged.

What I claim is:

1. The herein described guard having a slot therein forming an overhanging portion, a rib extending from the front end of said guard to the free end of said overhanging portion a plurality of projections extending the full length of said rib, said guard, overhanging portion, rib and projections being in one section.

2. The herein described guard having an overhanging portion thereon, a re-inforcing rib for said overhanging portion and a plurality of projections extending upwardly from said rib, one edge of each projection being disposed at an angle to the vertical, while the opposite edge thereof is vertical.

In testimony whereof I have signed my name to this specification in the presence of two subscribing witnesses.

HYRUM P. SCOFIELD.

Witnesses:
   E. M. PUGMIRE,
   ERMA HART.